United States Patent Office 3,420,827
Patented Jan. 7, 1969

3,420,827
PROCESS FOR MAKING 4,4-DIMETHYL-3-BU-
TENYL METHYL KETONES, INTERMEDIATES
THEREFOR AND THE SAID INTERMEDIATES
John C. Leffingwell, Winston-Salem, N.C., assignor, by
mesne assignments, to SCM Corporation, New York,
N.Y., a corporation of New York
No Drawing. Filed Dec. 10, 1965, Ser. No. 513,096
U.S. Cl. 260—247.2                                      10 Claims
Int. Cl. C07d 27/14; C07c 91/26; C07c 49/24

ABSTRACT OF THE DISCLOSURE

The preparation of (4,4-dilower alkyl substituted-3-butenyl) methyl ketones of the formula:

$$CH_3-\overset{O}{\underset{\|}{C}}-CH_2-CH_2-\overset{H}{\underset{}{C}}=C\overset{R'}{\underset{R''}{\diagdown}}$$

wherein R' and R" represent the same or different lower alkyl radicals, preferably methyl radicals, is described. Also described are novel enamine compounds which are useful as intermediates in the preparation of the above-mentioned ketones. The ketones are useful in the formulation of perfumes and pharmaceuticals since they have pleasing fragrant odors. Processes for preparing the novel enamine intermediates are also described.

This invention relates to the preparation of unsaturated ketones having more than seven carbon atoms, to intermediates obtained in preparing such ketones, and more particularly relates to the preparation of terpenoid ketones.

The ketones produced by this invention are referred to for convenience as (4,4-dilower alkyl substituted-3-butenyl) methyl ketones, i.e., they are ketones of the formula $$CH_3-\overset{O}{\underset{\|}{C}}-CH_2-CH_2-CH=C\overset{R'}{\underset{R''}{\diagdown}}$$

wherein R' and R" represent the same or different lower alkyl radicals.

Such ketones can have pleasing odors, e.g., the fragrance suggestive of citrus fruits exhibited by 6-methyl-5-octen-2-one, also sometimes called methyl 4-methyl-3-hexenyl ketone and additionally ketones such as 6-methyl-5-heptene-2-one also called methyl 4-methyl-3-pentenyl ketone are useful in preparing citral, linalool, geraniol, vitamin A, and the like by known methods. Thus these ketones are of particular interest to the perfume and pharmaceutical industries. I have now found a method for preparing such ketones in excellent yield, which method can include the economy of recovering and re-using a reactant.

In my overall process I establish and maintain an intimate mixture of a 1-halo-3,3-lower dialkyl substituted allyl compound, wherein the halogen is chlorine, bromine, or iodine, with an enamine of the formula $$\underset{\underset{CH_3-C=CH-CO_2R}{|}}{\overset{y\diagdown_N\diagup y}{}}$$

at a temperature between about 20 and about 200° C. until a quaternary salt of the formula $$\underset{\underset{CH_3-\overset{}{\underset{\|}{C}}-CH-CO_2R}{|}}{\overset{y\diagdown_{\overset{+}{N}}\diagup y}{}}\underset{R_1}{}$$

is formed, wherein in the foregoing formulas,

X is a chlorine, bromine, or iodine anion,
R is an ethyl, methyl, or t-butyl radical,
$R_1$ is a 3,3-lower dialkyl-substituted allyl radical having the formula:

$$-\overset{H}{\underset{H}{\overset{|}{C}}}-\overset{H}{\underset{}{\overset{|}{C}}}=C\overset{CH_3}{\underset{CH_3}{\diagdown}}$$

and $$\overset{y\diagdown_N\diagup y}{\underset{|}{}}$$

is the residue of a secondary amine having a $pK_b$ above that of diphenyl amine.

Continuing, I hydrolyze the resulting quaternary salt in the presence of water, thus producing a compound of the formula $$\underset{\underset{R_1}{|}}{\overset{CO_2R}{\underset{CH_3CO\overset{|}{C}H}{}}}$$

and by-product secondary amine, separate the said compound from the secondary amine, saponify the said separated compound resulting beta-ketoester with an alkali metal base, thereby producing resulting alkali salt of the formula $$\underset{\underset{R_1}{|}}{\overset{CO_2M}{\underset{CH_3CO\overset{|}{C}H}{}}}$$

and neutralize and decarboxylate the resulting alkali salt under aqueous acidic conditions, thereby preparing a (4,4-lower dialkyl substituted-3-butenyl) methyl ketone, wherein in the two foregoing formulas M is an alkali metal and R and $R_1$ are as described above.

Additionally, the invention includes the novel intermediate quaternary salt of the formula shown above, the process of preparing such salt, and the use of such salt, to prepare a (4,4-lower dialkyl substituted-3-butenyl) methyl ketone.

The enamine is prepared by reacting methyl acetoacetate, ethyl acetoacetate, tertiary butyl acetoacetate, or a mixture thereof with an appropriate secondary amine, such as one of those listed heerinbelow. Advantageously, to promte reaction efficiency the acetoacetic ester (methyl, ethyl, t-butyl, or mixture) is dispersed in liquid medium in the presence of the secondary amine and this resulting mixture is maintained, during reaction, at a temperature above about 50° C. For most efficient reaction I prefer to heat this mixture to establisch and maintain a reflux condition and, while refluxing, to employ apparatus for removing water formed in the reaction during refluxing. However, to avoid decomposing the forming enamine, I prefer to maintain a reflux temperature which is not above about 200° C. To insure approaching complete reaction, I prefer to continue refluxing until substantially all water is removed, based on the formation of one mole of water from reacting one mole of acetoacetate ester with one mole of secondary amine. To accelerate the reaction, a minor portion of a catalyst such as p-toluenesulfonic acid can be included in the refluxing mixture. When a liquid medium has been used for preparing the enamine, the medium can be removed after reaction, if desired, by a conventional method, e.g., distillation, to isolate the enamine produced.

Suitable liquid solvent media which I can or have used in preparing the enamine include benzene, toluene, and the like, and preferably benzene for economy. Suitable secondary amines are those having a $pK_b$ above that of diphenyl amine, i.e., greater than 0.85 as measured in aqueous solution at 20° C. Preferably for efficient reaction, such amines are sufficiently basic to exhibit such pK$_b$ greater than about 2. Amines which I can and have used, and their respective pK$_b$ values in aqueous solution at 25° C., are pyrrolidine (2.90), morpholine (5.61), piperidine (11.12), and diethanolamine (8.88). For efficiency and economical enamine preparation I prefer to use pyrrolidine.

The enamine is then used to produce a quaternary salt, the general formula for which has been depicted above, by reaction with a 1-halo-3,3-lower dialkyl substituted allyl compound. The halogens which I can use in these allyl compounds are bromine, chlorine, or iodine. By the use of the term "allyl" herein, I mean the hydrocarbon radical, containing a double bond, also sometimes referred to as "α-allyl," i.e., —CH$_2$—CH=CH<. The lower alkyl substituents on the allyl radical generally are saturated aliphatic hydrocarbon radicals having not more than four carbon atoms, preferably both of the same kind and both unbranched to take advantage of the most widely available reactants. Typical 1-halo-3,3-dialkyl substituted allyl compounds are 1-bromo-3-methyl-butene-2, hereinafter referred to for convenience as prenyl bromide, and 1-chloro-3-methyl-butene-2, hereinafter referred to for convenience as prenyl chloride.

To form the quaternary salt with dispatch the enamine is dispersed in an inert liquid medium, heated above about 50° C., and at least about one mole of prenyl bromide or other such halogenated allyl compound, basis each mole of the enamine, is added to the heated mixture. Preferably, for economy and efficiency, I use the enamine retained in its liquid medium of formation, as described hereinabove, and heat this mixture to reflux while gradually adding a slight excess, e.g., about 1.1–1.2 moles of the allyl material such as prenyl bromide (1-bromo-3-methyl-butene-2), basis each mole of enamine in the refluxing medium. Under these preferred refluxing conditions, I employ an inert reaction atmosphere which can be, for example, gaseous nitrogen, to avoid oxidation of the enamine. When using a refluxing liquid reaction medium I advantageously reflux for at least about 6 hours to obtain a substantial yield of quaternary salt, and for best yields I prefer to reflux the reaction medium for about 10–24 hours.

Suitable inert liquid media for making the quaternary salt include benzene, toluene, propyl ether, acetonitrile, ethanol, dioxane, xylene, mesitylene, and tetrahydrofuran. I prefer to use benzene for economy. Upon formation of the quaternary salt in such liquid medium, for economy the salt is preferably retained therein for subsequent hydrolysis, or it can be separated by a conventional method, e.g., crystallization.

The quaternary salt is then hydrolyzed to produce a compound of the formula CH$_3$COCH(R$_1$)CO$_2$R wherein R and R$_1$ are as defined above. Such a compound is referred to herein for convenience as a "beta-ketoester." The hydrolysis also regenerates the secondary amine, e.g., as the acid salt in acidic hydrolysis, which can be recovered, e.g., by treating the acid salt from acidic hydrolysis with alkali base to liberate free secondary amine and then extracting or distilling the amine from the basic aqueous medium. The amine can then be reused to prepare more enamine.

Advantageously, I hydrolyze the quaternary salt, still in its previous liquid reaction medium, by vigorously mixing it at temperatures above about 50° C., with at least about a mole of water per mole of quaternary salt, the water having pH below 7, although aqueous neutral or basic hydrolysis can also be employed. For efficiency and economy I prefer to use a substantial molar excess of water, at a temperature between about 60° and 150° C. and pH between about 3.6 and about 5.6. In hydrolysis the reaction is preferably blanketed with inert gas such as nitrogen to protect against oxidative reaction of any liberated secondary amine.

I heat and stir the reactants for about ½ hour to obtain a substantial yield of beta-ketoester, and to favor substantial completion of hydrolysis I prefer to heat and stir the reactants for about 1–4 hours. Suitable materials for obtaining acidic conditions include any conventional hydrogen ion source for hydrolysis of organic material in liquid medium. Preferably, to maintain the liquid hydrolysis medium within the pH range of from about 3.6 to 5.6 I use a buffer mixture such as an acetic acid-sodium acetate buffer mixture. Such a mixture is generally prepared with water, or water plus alcohol, to supply at least a portion of the water for hydrolyzing the quaternary salt. For a pH of about 3.6 in water solution, about 1.9 gram moles of acetic acid are used with about 0.15 gram moles of sodium acetate, both on a basis of one liter of water. For a pH of about 5.6 in water solution, about 0.2 gram moles of acetic acid is used with about 1.8 gram moles of sodium acetate, both on a basis of one liter of water.

The reaction mixture can be diluted with water after hydrolysis and the product beta-ketoester extracted with solvent. After separating the resulting extract solvent from the remainder of the diluted hydrolysis mixture, this resulting extract solvent can be fractionally distilled to isolate the beta-ketoester.

The beta-ketoester is then saponified with an alkali metalliferous base to form the resulting alkali metal salt. For economy I saponify the beta-ketoester in tap water, with stirring and heating to above about 40° C., and with the addition of sufficient alkali metalliferous base to maintain the pH of the liquid medium above about 9.5. To promote reaction efficiency I prefer to heat the saponification medium to a temperature between about 50 and 90° C., while maintaining the pH of the medium between about 9.5 and 14.0. Under these preferred conditions, to obtain a substantial yield of alkali metal salt I heat and stir the saponification medium for about ½ hour, and to enhance approaching completion of reaction I prefer to heat and stir for about 1–4 hours.

The resulting alkali metal salt generally is not separated from the liquid saponification medium but, instead, is subsequently neutralized in such medium to form the desired (4,4-lower dialkyl substituted-3-butenyl)methyl ketone. Suitable alkali bases which I can or have used include the hydroxides of lithium, sodium, potassium, rubidium, and cesium and materials which generate hydroxide ion in aqueous medium such as sodium carbonate and potassium carbonate. Preferably for efficiency and economy, I use sodium or potassium hydroxide because of their ready commercial availability.

The resulting saponification mixture is neutralized with acid to obtain decarboxylation and to produce the (4,4-lower dialkyl substituted-3-butenyl)methyl ketone. To obtain careful reaction control I neutralize at a temperature for the reaction medium of below about 20° C., and preferably for best reaction control, at a temperature between about 0 to 15° C. For neutralization I can use any hydrogen ion donor suitable for neutralizing organic alkali metal salts in liquid medium. For economy I prefer to use hydrochloric, nitric, sulfuric and like readily available commercial acids.

The neutralization mixture can be extracted with solvent, the resulting extract solvent separated from the remaining neutralization mixture, and then this extract solvent distilled to obtain the (4,4-lower dialkyl substituted-3-butenyl)methyl ketone.

The following examples show ways in which the invention has been practiced, but should not be construed as limiting the invention. All parts used therein and not otherwise specifically detailed are parts by weight and all temperatures are in degrees centigrade unless otherwise specified.

Example 1

130 parts of ethyl acetoacetate were dissolved in 300 parts of benzene and 71 parts pyrrolidine were added.

This resulting mixture was formed in a flask equipped with a Dean-Stark trap for subsequent removal of water, a reflux condenser, and a gaseous nitrogen filled balloon connected to the condenser outlet for maintaining the flask under a slight positive nitrogen pressure during reaction. The mixture was refluxed for 6 hours until 18 parts of water were separated. The trap was then removed and the flask was equipped with a fine inlet for introducing prenyl bromide (e.g. 1-bromo-3-methyl-butene-2). The mixture was again heated to reflux under a nitrogen atmosphere and 180 parts of prenyl bromide were added drop-wise. The addition time was 30 minutes and after the addition gentle reflux was continued, with continuing nitrogen feed, for 12 hours.

After 12 hours the refluxing was discontinued and as the resulting reflux mixture cooled, an orange-red crystalline precipitate was observed to settle from the mixture. This precipitate was identified as (2-carbethoxy-1,5-dimethyl-4-hexenylidene-1) pyrrolidinium bromide, ethyl ester, by subsequent hydrolysis to 2-methyl-5-carbethoxy-2-heptene-6-one, (sometimes also called 6-methyl-3-carbethoxy-5-heptene-2-one) which compound was confirmed by infrared spectrum analysis.

Example 2

The process of Example 1 was repeated to prepare a similar reflux mixture containing 1-(2-carbethoxy-1,5-dimethyl-4-hexenylidene) pyrrolidinium bromide, ethyl ester. This reflux mixture was cooled to 75° and then heated to maintain that temperature, wtih stirring. Under these conditions and a nitrogen atmosphere, a feed of 150 parts of a buffer solution was gradually added. This solution was an acetic acid (1.0 part)-sodium acetate (0.9 part)-water (1.0 part) buffer. The heating and stirring was continued for 3 hours after the buffer addition.

After three hours the resulting hydrolyzed mixture was poured from the flask into 500 parts water. This aqueous mixture was extracted with petroleum ether having a boiling range of about 60–90° (being predominantly aliphatic hydrocarbons), and the resulting oil portion was separated from the water portion by means of a separatory funnel. Pyrrolidine could be recovered from the aqueous fraction of neutralization by fractional distillation or solvent extraction after addition of sufficient alkali base to neutralize the aqueous fraction and thus liberate pyrrolidine from its water-soluble amine-acid salt. The oil portion was fractionally distilled to yield 188 parts of crude 2-methyl-5-carbethoxy-2-heptene-6-one, confirmed by infrared spectrum analysis. Gas-liquid phase chromatography analysis of the oil portion showed a weight ratio of 2-methyl-5-carbethoxy-2-heptene-6-one to ethyl acetoacetate (from the unreacted enamine) of 87.5:12.5.

The 188 parts of crude 2-methyl-5-carbethoxy-2-heptene-6-one were added, with stirring, to 300 parts of sodium hydroxide solution containing 30 parts NaOH, and the solution was heated to 55°. Heating was continued, with stirring, for 3 hours. The saponified mixture then was poured into ice and thus cooled to about 0°, and subsequently neutralized with concentrated aqueous hydrochloric acid. This neutralized mixture was extracted with the petroleum ether described hereinabove, and the resulting oil portion was separated from the aqueous portion by means of a separatory funnel. Fractional distillation of the oil portion yielded 92 parts of 2-methyl-2-heptene-6-one, basis 130 parts of starting ethyl acetoacetate, which was contaminated with 8 weight percent impurities as determined by gas-liquid phase chromatography. An aliquot of the extract solution was fractionally distilled to isolate substantially pure 2-methyl-2-heptene-6-one distilling at 106°/100 mm. The compound was identified by infrared spectrum analysis.

Example 3

The process of Example 1 was repeated to prepare a similar reflux mixture except that 85 parts of piperidine were used in place of the 71 parts of pyrrolidine for reaction with ethyl acetoacetate. The resulting quaternary salt in the reflux mixture was hydrolyzed in a manner similar to that described in Example 2 and yielded a product mixture having a weight ratio of 2-methyl-5-carbethoxy-2-heptene-6-one to ethyl acetoacetate (from the unreacted enamine) of 81:19.

Example 4

The process of Example 1 was repeated to prepare a similar reflux mixture except that: (1) 105 parts of diethanolamine were used in place of the 71 parts of pyrrolidine for reaction with ethyl acetoacetate; (2) ethanol was used as a reaction medium in place of benzene; and (3) 125 parts of prenyl chloride (e.g., 1-chloro-3-methyl-butene-2) were added instead of the 180 parts of prenyl bromide (e.g., 1-bromo-3-methyl-butene-2).

The resulting quaternary salt in reflux mixture was hydrolyzed in a manner similar to that described in Example 2 and yielded a product mixture having a weight ratio of 2-methyl-5-carbethoxy-2-heptene-6-one to ethyl acetoacetate (from the unreacted enamine) of 70:30.

I claim:

1. A quaternary nitrogen containing compound of the formula:

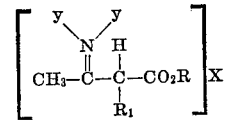

wherein:

X is chlorine, bromine or iodine;

is the residue of a secondary amine having a pK$_b$ above that of diphenylamine;

R is ethyl, methyl or t-butyl; and

R$_1$ is

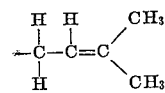

2. The compound of claim 1 wherein R is ethyl.

3. The process for preparing the quaternary nitrogen containing compound of claim 1 which comprises establishing and maintaining an intimate mixture of a substituted butene of the formula:

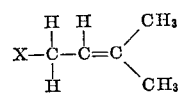

where X is chlorine, bromine or iodine and an enamine compound of the formula:

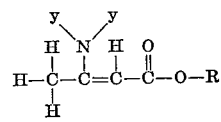

wherein:

R is ethyl, methyl or t-butyl; and

is the residue of a secondary amine having a pK$_b$ above that of diphenyl amine for a time sufficient to form said quaternary nitrogen containing compound.

4. The process of claim 3 wherein R is ethyl.

5. The process of claim 4 wherein said mixture is maintained at an inert liquid medium at a temperature of from about 50° to about 150° C. for at least 6 hours.

6. The process which comprises the steps of:
(a) hydrolyzing a quaternary nitrogen containing compound of the formula:

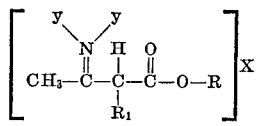

in the presence of water to form a by-product secondary amine and a compound of the formula:

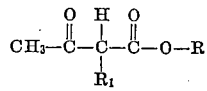

(b) saponifying said last mentioned compound with an alkali metal base to form the alkali metal salt, and
(c) neutralizing and decarboxylating said salt thereby producing a (4,4-dilower alkyl-3-butenyl) methyl ketone wherein in the foregoing formulae:
X is a chlorine, bromine or iodine anion;

is a secondary amine having a pK$_b$ above that of diphenyl amine;
R is ethyl, methyl or t-butyl; and
R$_1$ is

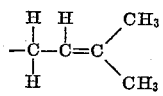

7. The process of claim 6 where R is ethyl.

8. The process of claim 7 wherein the hydrolysis is carried out at a temperature between about 50° C. and about 150° C. for at least one-half hour in aqueous medium having a pH maintained below about 7. The saponification is carried out at a temperature between about 40° C. and about 90° C. with an alkali metal hydroxide and the neutralization and decarboxylation is carried out at a temperature between about 0° C. and about 20° C.

9. The process comprising the steps of:
(a) establishing and maintaining an intimate mixture of:
(i) 1-halo-3-methyl-butene-2, and (ii) a compound of the formula

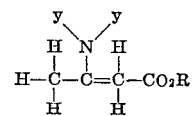

at a temperature between about 20° C. and 200° C. until a quaternary nitrogen containing compound of the formula

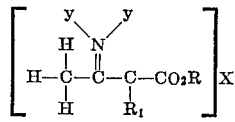

is formed,
(b) hydrolyzing said quaternary nitrogen containing compound in the presence of water to form by-product secondary amine and a compound of the formula:

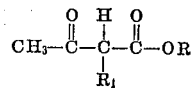

(c) saponifying said last mentioned compound with an alkali metal base to form the alkali metal salt,
(d) neutralizing and decarboxylating said salt, thereby producing a (4,4-di-lower alkyl-3-butenyl) methyl ketone wherein in the foregoing formulae:
X is a chlorine, bromine or iodine anion;

is a secondary amine having a pK$_b$ above that of diphenyl amine;
R is ethyl, methyl or t-butyl; and
R$_1$ is

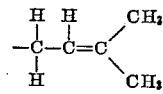

10. The process of claim 9 where R is ethyl.

References Cited

UNITED STATES PATENTS 3,305,562   2/1967   Heffe _____ 260—326.5

ALTON D. ROLLINS, *Primary Examiner.*

JOSE TOVAR, *Assistant Examiner.*

U.S. Cl. X.R.

260—294.3, 326.3, 482, 483, 595, 593